United States Patent
Ishioka

(10) Patent No.: US 11,414,079 B2
(45) Date of Patent: Aug. 16, 2022

(54) VEHICLE CONTROL SYSTEM, VEHICLE CONTROL METHOD, AND STORAGE MEDIUM

(71) Applicant: HONDA MOTOR CO., LTD., Tokyo (JP)

(72) Inventor: Atsushi Ishioka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 495 days.

(21) Appl. No.: 16/475,694

(22) PCT Filed: Nov. 24, 2017

(86) PCT No.: PCT/JP2017/042193
§ 371 (c)(1),
(2) Date: Jul. 3, 2019

(87) PCT Pub. No.: WO2018/131298
PCT Pub. Date: Jul. 19, 2018

(65) Prior Publication Data
US 2019/0375412 A1    Dec. 12, 2019

(30) Foreign Application Priority Data
Jan. 13, 2017    (JP) .............................. JP2017-004180

(51) Int. Cl.
*B60W 30/18*    (2012.01)
*B60W 30/09*    (2012.01)
(Continued)

(52) U.S. Cl.
CPC ...... *B60W 30/18163* (2013.01); *B60W 10/18* (2013.01); *B60W 30/09* (2013.01);
(Continued)

(58) Field of Classification Search
CPC .......... B60W 30/18163; B60W 10/18; B60W 30/09; B60W 2554/801; G06V 20/584; G08G 1/167
See application file for complete search history.

(56) References Cited

U.S. PATENT DOCUMENTS

2006/0009910 A1    1/2006    Ewerhart et al.
2012/0296522 A1    11/2012   Otuka
(Continued)

FOREIGN PATENT DOCUMENTS

CN    101396968    4/2009
EP    2942765      11/2015
(Continued)

OTHER PUBLICATIONS

International Search Report and Written Opinion for International Application No. PCT/JP2017/042193 dated Feb. 20, 2018, 13 pgs.
Chinese Office Action for Chinese Patent Application No. 201780082691.6 dated Dec. 29, 2021.

*Primary Examiner* — Peter D Nolan
*Assistant Examiner* — Demetra R Smith-Stewart
(74) *Attorney, Agent, or Firm* — Amin, Turocy & Watson, LLP

(57) ABSTRACT

A vehicle control system includes: a recognizer that recognizes one or more other vehicles present in the vicinity of a subject vehicle; a running controller that performs lane change control of performing lane change of the subject vehicle by controlling at least steering of the subject vehicle; and a determiner that determines whether or not a degree of braking predicted to be generated in a reference vehicle due to the lane change of the subject vehicle is equal to or higher than a threshold on the basis of a relative relationship between the reference vehicle present in a lane that is a destination of the lane change among the one or more other vehicles that have been recognized by the recognizer and the
(Continued)

subject vehicle in a case in which the lane change control is performed by the running controller, wherein the running controller stops the lane change control in a case in which it is determined by the determiner that the degree of braking is equal to or higher than the threshold.

14 Claims, 12 Drawing Sheets

(51) Int. Cl.
- *B60W 10/18* (2012.01)
- *G06K 9/00* (2022.01)
- *G06G 1/16* (2006.01)
- *G08G 1/16* (2006.01)
- *G06V 20/58* (2022.01)

(52) U.S. Cl.
CPC ........... *G06V 20/584* (2022.01); *G08G 1/167* (2013.01); *B60W 2554/801* (2020.02)

(56) References Cited

U.S. PATENT DOCUMENTS

| | | | |
|---|---|---|---|
| 2016/0297447 A1 | 10/2016 | Suzuki et al. | |
| 2017/0008531 A1 | 1/2017 | Watanabe | |
| 2017/0240186 A1* | 8/2017 | Hatano | B60W 30/095 |
| 2017/0270799 A1* | 9/2017 | Takeda | B60W 30/00 |
| 2017/0344023 A1* | 11/2017 | Laubinger | G08G 1/22 |
| 2018/0157257 A1* | 6/2018 | Hashimoto | B62D 15/0255 |

FOREIGN PATENT DOCUMENTS

| | | | | |
|---|---|---|---|---|
| JP | 2000-020898 | | 1/2000 | |
| JP | 2007-186141 | | 7/2007 | |
| JP | 2011-186737 | | 9/2011 | |
| JP | 2015052865 | | 4/2015 | |
| JP | 2017030435 A | * | 2/2017 | |
| JP | 2017165201 A | * | 9/2017 | ............. B62D 15/02 |

* cited by examiner

VEHICLE CONTROL SYSTEM, VEHICLE CONTROL METHOD, AND STORAGE MEDIUM

TECHNICAL FIELD

The present invention relates to a vehicle control system, a vehicle control method, and a storage medium.

Priority is claimed on Japanese Patent Application No. 2017-004180, filed Jan. 13, 2017, the content of which is incorporated herein by reference.

BACKGROUND ART

Conventionally, technologies for determining whether or not lane change can be performed on the basis of a relative speed and a relative distance with respect to a surrounding vehicle present at a destination of the lane change in a case in which a subject vehicle performs lane change are known (for example, see Patent Document 1).

PRIOR ART DOCUMENTS

Patent Documents

[Patent Document 1]
Japanese Unexamined Patent Application, First Publication No. 2000-20898

SUMMARY OF INVENTION

Problems to be Solved by the Invention

However, in such conventional technologies, it is determined whether lane change can be performed using a subject vehicle as a subject, and accordingly, influences on surrounding vehicles according to lane change are not sufficiently considered.

The present invention is realized in consideration of such situations, and one objective thereof is to provide a vehicle control system, a vehicle control method, and a storage medium with a vehicle control program capable of performing lane change with surrounding vehicles taken into account.

Solution to Problem (1) A vehicle control system, including: a recognizer that recognizes one or more other vehicles present in the vicinity of a subject vehicle; a running controller that performs lane change control of performing lane change of the subject vehicle by controlling at least steering of the subject vehicle; and a determiner that determines whether or not a degree of braking predicted to be generated in a reference vehicle due to the lane change of the subject vehicle is equal to or higher than a threshold on the basis of a relative relationship between the reference vehicle present in a lane that is a destination of the lane change among the one or more other vehicles that have been recognized by the recognizer and the subject vehicle in a case in which the lane change control is performed by the running controller, wherein the running controller stops the lane change control in a case in which it is determined by the determiner that the degree of braking is equal to or higher than the threshold.

(2) In the vehicle control system described in (1), the determiner derives a braking distance predicted to be run by the reference vehicle until a speed of the reference vehicle decelerating in accordance with braking becomes the same degree of a speed of the subject vehicle on the basis of a relative speed between the subject vehicle and the reference vehicle and compares the derived braking distance with a relative distance between the subject vehicle and the reference vehicle and determines that the degree of braking is equal to higher than the threshold in a case in which the braking distance is equal to or longer than the relative distance.

(3) In the vehicle control system described in (2), the determiner derives the braking distance at a time point at which the lane change control is performed by the running controller using correspondence information for acquiring the braking distance in a case in which it is assumed that braking is performed with a constant braking force.

(4) In the vehicle control system described in (3), the determiner selects one piece of the correspondence information among a plurality of pieces of the correspondence information in accordance with an absolute speed of at least one of the subject vehicle and the reference vehicle.

(5) In the vehicle control system described in any one of (1) to (4), the determiner changes the threshold in accordance with a situation of the lane that is the destination of the lane change.

(6) In the vehicle control system described in any one of (2) to (4), the determiner derives the braking distance on the basis of a situation of the lane that is the destination of the lane change.

(7) In the vehicle control system described in any one of (1) to (6), the determiner changes the threshold in accordance with an absolute speed of at least one of the subject vehicle and the reference vehicle.

(8) In the vehicle control system described in (2), the determiner derives the braking distance on the basis of an absolute speed of at least one of the subject vehicle and the reference vehicle.

(9) In the vehicle control system described in any one of (1) to (8), the determiner changes the threshold in accordance with a type of the reference vehicle.

(10) In the vehicle control system described in any one of (2) to (4), the determiner derives the braking distance on the basis of a type of the reference vehicle.

(11) In the vehicle control system described in any one of (1) to (10), the determiner derives a braking distance predicted to be run by the reference vehicle until a speed of the reference vehicle decelerating in accordance with braking becomes the same degree of a speed of the subject vehicle on the basis of a relative speed between the subject vehicle and the reference vehicle and adds a margin based on a time acquired by dividing a distance from a position of the reference vehicle to a position of the subject vehicle at a time point at which the lane change control is performed by the running controller by a speed of the reference vehicle at the time point to the derived braking distance and determines that the degree of braking is equal to or higher than the threshold in a case in which a sum of the braking distance and the margin is equal to or higher than a relative distance between the subject vehicle and the reference vehicle.

(12) In the vehicle control system described in any one of (1) to (11), the determiner changes the threshold in accordance with a necessity for lane change.

(13) In the vehicle control system described in any one of (1) to (12), the determiner repeats determination of whether the degree of braking is equal to or higher than the threshold using a newly recognized vehicle as the reference vehicle every time a new vehicle is recognized in the lane that is a destination of the lane change by the recognizer before the lane change is completed.

(14) A vehicle control system including: a recognizer that recognizes one or more other vehicles present in the vicinity of a subject vehicle; a running controller that performs lane change control of performing lane change of the subject vehicle by controlling at least steering of the subject vehicle; and a determiner that determines whether or not a speed of the reference vehicle is lower than a speed of the subject vehicle until a relative distance between the subject vehicle and the reference vehicle becomes a predetermined distance in a case in which it is assumed that braking of the reference vehicle is performed with a predetermined degree of braking on the basis of a relative relationship between the reference vehicle present in a lane that is a destination of the lane change among the one or more other vehicles that have been recognized by the recognizer and the subject vehicle in a case in which the lane change control is performed by the running controller, wherein the running controller stops the lane change control in a case in which it is determined by the determiner that the speed of the reference vehicle is equal to or higher than the speed of the subject vehicle.

(15) A vehicle control method using an in-vehicle computer, the vehicle control method including: recognizing one or more other vehicles present in the vicinity of a subject vehicle; performing lane change control of performing lane change of the subject vehicle by controlling at least steering of the subject vehicle; determining whether or not a degree of braking predicted to be generated in a reference vehicle due to the lane change of the subject vehicle is equal to or higher than a threshold on the basis of a relative relationship between the reference vehicle present in a lane that is a destination of the lane change among the recognized one or more other vehicles and the subject vehicle in a case in which the lane change control is performed; and stopping the lane change control in a case in which it is determined that the degree of braking is equal to or higher than the threshold.

(16) A computer-readable non-transitory storage medium storing a vehicle control program causing an in-vehicle computer to execute: recognizing one or more other vehicles present in the vicinity of a subject vehicle; performing lane change control of performing lane change of the subject vehicle by controlling at least steering of the subject vehicle; determining whether or not a degree of braking predicted to be generated in a reference vehicle due to the lane change of the subject vehicle is equal to or higher than a threshold on the basis of a relative relationship between the reference vehicle present in a lane that is a destination of the lane change among the recognized one or more other vehicles and the subject vehicle in a case in which the lane change control is performed; and stopping the lane change control in a case in which it is determined that the degree of braking is equal to or higher than the threshold.

Advantageous Effects of Invention

According to (1) to 16), lane change with surrounding vehicles taken into account can be performed.

EMBODIMENTS FOR CARRYING OUT THE INVENTION

Hereinafter, a vehicle control system, a vehicle control method, and a vehicle control program according to embodiments of the present invention will be described with reference to the drawings.

First Embodiment

Figure 1:
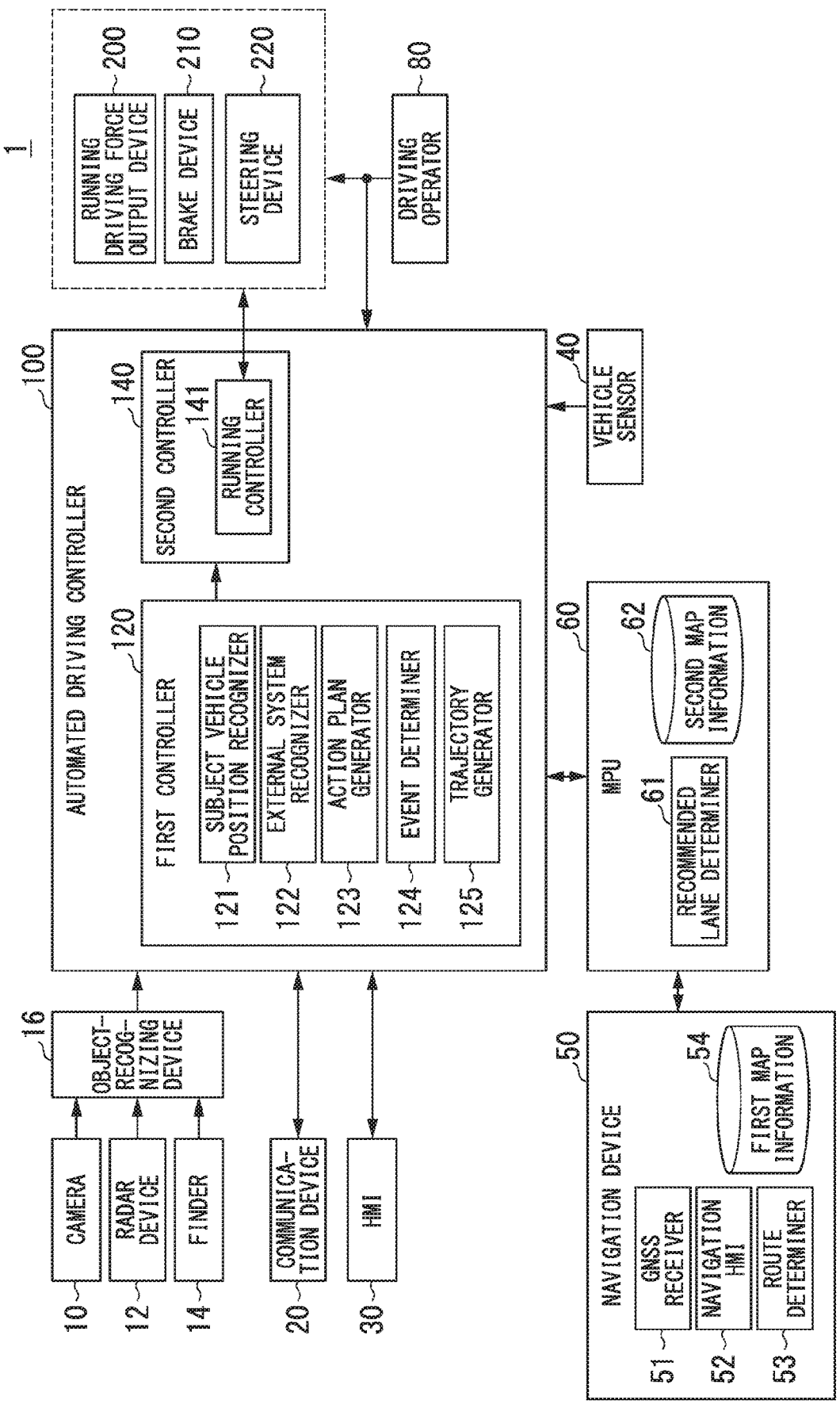
FIG. 1 is a configuration diagram of a vehicle control system 1 according to a first embodiment.

FIG. 1 is a configuration diagram of a vehicle control system 1 according to a first embodiment. A vehicle in which the vehicle control system 1 is mounted (hereinafter, referred to as a "subject vehicle M") is, for example, a vehicle having two wheels, three wheels, four wheels, or the like, and a driving source thereof is an internal combustion engine such as a diesel engine or a gasoline engine, an electric motor, or a combination thereof. An electric motor operates using power generated using a power generator connected to an internal combustion engine or discharge power of a secondary cell or a fuel cell.

The vehicle control system 1, for example, includes a camera 10, a radar device 12, a finder 14, an object-recognizing device 16, a communication device 20, a human machine interface (HMI) 30, a vehicle sensor 40, a navigation device 50, a micro-processing unit (MPU) 60, a driving operator 80, an automated driving controller 100, a running driving force output device 200, a brake device 210, and a steering device 220. Such devices and units are interconnected using a multiplex communication line such as a controller area network (CAN) communication line, a serial communication line, a radio communication network, or the like. In addition, the configuration illustrated in FIG. 1 is merely one example, and thus, some components may be omitted, and, furthermore, another component may be added thereto.

The camera 10, for example, is a digital camera using a solid-state imaging device such as a charge-coupled device (CCD) or a complementary metal oxide semiconductor (CMOS). One or a plurality of cameras 10 are installed at arbitrary places in a vehicle (hereinafter, referred to as a subject vehicle M) in which the vehicle control system 1 is mounted. In a case in which the side in front is to be imaged, the camera 10 is installed at an upper part of a front windshield, a rear face of a rear-view mirror, or the like. The camera 10, for example, repeatedly images the surroundings of the subject vehicle M periodically. The camera 10 may be a stereo camera.

The radar device 12 emits radiowaves such as millimeter waves to the vicinity of the subject vehicle M and detects at least a position (a distance and an azimuth) of an object by detecting radiowaves (reflected waves) reflected by the object. One or a plurality of radar devices 12 are installed at arbitrary places in the subject vehicle M. The radar device 12 may detect a position and a speed of an object using a frequency-modulated continuous wave (FMCW) system.

The finder 14 is a light detection and ranging or a laser imaging detection and ranging (LIDAR) finder that detects a distance to a target by measuring light scattered from emitted light. One or a plurality of finders 14 are installed at arbitrary places in the subject vehicle M.

The object-recognizing device 16 may perform a sensor fusion process on results of detection using some or all of the camera 10, the radar device 12, and the finder 14, thereby recognizing a position, a type, a speed, and the like of an object. The object-recognizing device 16 outputs a result of recognition to the automated driving controller 100.

The communication device 20, for example, communicates with other vehicles present in the vicinity of the subject vehicle M (one example of surrounding vehicles) using a cellular network, a Wi-Fi network, Bluetooth (registered trademark), dedicated short-range communication (DSRC), or the like or communicates with various server apparatuses through a radio base station.

The HMI 30 presents various types of information to a vehicle occupant of the subject vehicle M and receives an input operation performed by a vehicle occupant. The HMI 30 includes various display devices, a speaker, a buzzer, a touch panel, a switch, an input key, and the like.

The vehicle sensor 40 includes a vehicle speed sensor detecting a speed of the subject vehicle M, an acceleration sensor detecting an acceleration, a yaw rate sensor detecting an angular velocity around a vertical axis, an azimuth sensor detecting the azimuth of the subject vehicle M, and the like. The vehicle sensor 40 outputs detected information (a speed, an acceleration, an angular velocity, an azimuth, and the like) to the automated driving controller 100.

The navigation device 50, for example, includes a global navigation satellite system (GNSS) receiver 51, a navigation HMI 52, and a route determiner 53 and stores first map information 54 in a storage device such as a hard disk drive (HDD) or a flash memory. The GNSS receiver 51 identifies a position of the subject vehicle M on the basis of signals received from GNSS satellites. The position of the subject vehicle M may be identified or complemented for by an inertial navigation system (INS) using an output of the vehicle sensor 40.

The navigation HMI 52 includes a display device, a speaker, a touch panel, an input key, and the like. A part or the whole of the navigation HMI 52 and the HMI 30 described above may be configured to be shared. The route determiner 53, for example, determines a route from a location of the subject vehicle M identified by the GNSS receiver 51 (or an input arbitrary location) to a destination input by a vehicle occupant using the navigation HMI 52 by referring to the first map information 54. The first map information 54, for example, is information in which a road form is represented by respective links representing a road and respective nodes connected using the links. The first map information 54 may include a curvature of each road, point of interest (POI) information, and the like. The route determined by the route determiner 53 is output to the MPU 60. In addition, the navigation device 50 may perform route guidance using the navigation HMI 52 on the basis of the route determined by the route determiner 53. Furthermore, the navigation device 50, for example, may be realized by a function of a terminal device such as a smartphone or a tablet terminal carried by a user. In addition, the navigation device 50 may transmit a current location and a destination to a navigation server through the communication device 20 and acquire a route received from the navigation server as a reply.

The MPU 60, for example, functions as a recommended lane determiner 61 and maintains second map information 62 in a storage device such as an HDD or a flash memory. The recommended lane determiner 61 divides a route provided from the navigation device 50 into a plurality of blocks (for example, divides the route into blocks of 100 m in the advancement direction of the vehicle) and determines a recommended lane for each block by referring to the second map information 62. For example, in a case in which there are a plurality of lanes in a route provided from the navigation device 50, the recommended lane determiner 61 determines one recommended lane among the plurality of lanes. In a case in which a branching place, a merging place, or the like is present in the provided route, the recommended lane determiner 61 determines a recommended lane such that the subject vehicle M can run on a reasonable running route for advancement to a branch destination.

The second map information 62 is map information having an accuracy higher than that of the first map information 54. In addition, the second map information 62, for example, includes information of the center of respective lanes, information on boundaries between lanes, or the like. In addition, in the second map information 62, road information, traffic regulations information, address information (address and zip code), facilities information, telephone number information, and the like may be included. In the road information, information representing a type of road such as an expressway, a toll road, a national highway, or a prefectural road and information such as the number of lanes of a road, a width of each lane, a gradient of a road, a position of a road (three-dimensional coordinates including longitude, latitude, and a height), a curvature of the curve of a lane, locations of merging and branching points of lanes, signs installed on a road, and the like are included. The second map information 62 may be updated as is necessary by accessing another device using the communication device 20.

The driving operator 80, for example, includes an acceleration pedal, a brake pedal, a shift lever, a steering wheel, and the like. A sensor detecting the amount of an operation or the presence/absence of an operation is installed in the driving operator 80, and a result of detection acquired by the sensor described above is output to one or both of the automated driving controller 100 and the running driving force output device 200, the brake device 210, or the steering device 220.

The automated driving controller 100, for example, includes a first controller 120 and a second controller 140. Each of the first controller 120 and the second controller 140 is realized by a processor such as a central processing unit (CPU) executing a program (software). In addition, some or all of constituent elements of the first controller 120 and the second controller 140 may be realized by hardware (a circuit unit; including circuitry) such as a large-scale integration (LSI), an application-specific integrated circuit (ASIC), a field-programmable gate array (FPGA), a graphics-processing unit (GPU) or the like or may be realized by cooperation between software and hardware.

The first controller 120, for example, includes an external system recognizer 121, a subject vehicle position recognizer 122, an action plan generator 123, an event determiner 124, and a trajectory generator 125.

The external system recognizer 121 recognizes states of surrounding vehicles such as positions, speeds, and accelerations on the basis of information input from the camera 10, the radar device 12, and the finder 14 directly or through the object-recognizing device 16. The position of a surrounding vehicle may be represented as a representative point of the surrounding vehicle such as the center of gravity, a corner, or the like and may be represented by an area represented by the contour of the surrounding vehicle. The "state" of a surrounding vehicle may include an acceleration or a jerk or may be an "action state" (for example, whether the vehicle is changing lanes or is to change lanes) of the surrounding vehicle. In addition, the external system recognizer 142 may recognize positions of a guard rail, a telegraph pole, a parked vehicle, a pedestrian, a mark on a road surface, signs, and other objects in addition to the surrounding vehicles.

The subject vehicle position recognizer 122, for example, recognizes a lane in which the subject vehicle M is running (a running lane) and a relative position and a posture of the subject vehicle M with respect to the running lane. The subject vehicle position recognizer 122, for example, recognizes the running lane by comparing a pattern (for example, an array of solid lines and broken lines) of a road partition line that is acquired from the second map information 62 with a pattern of the road partition line in the vicinity of the subject vehicle M that is recognized from an image captured by the camera 10. In this recognition, the position of the subject vehicle M acquired from the navigation device 50 and a processing result acquired using the INS may be additionally taken into account.

Figure 2:
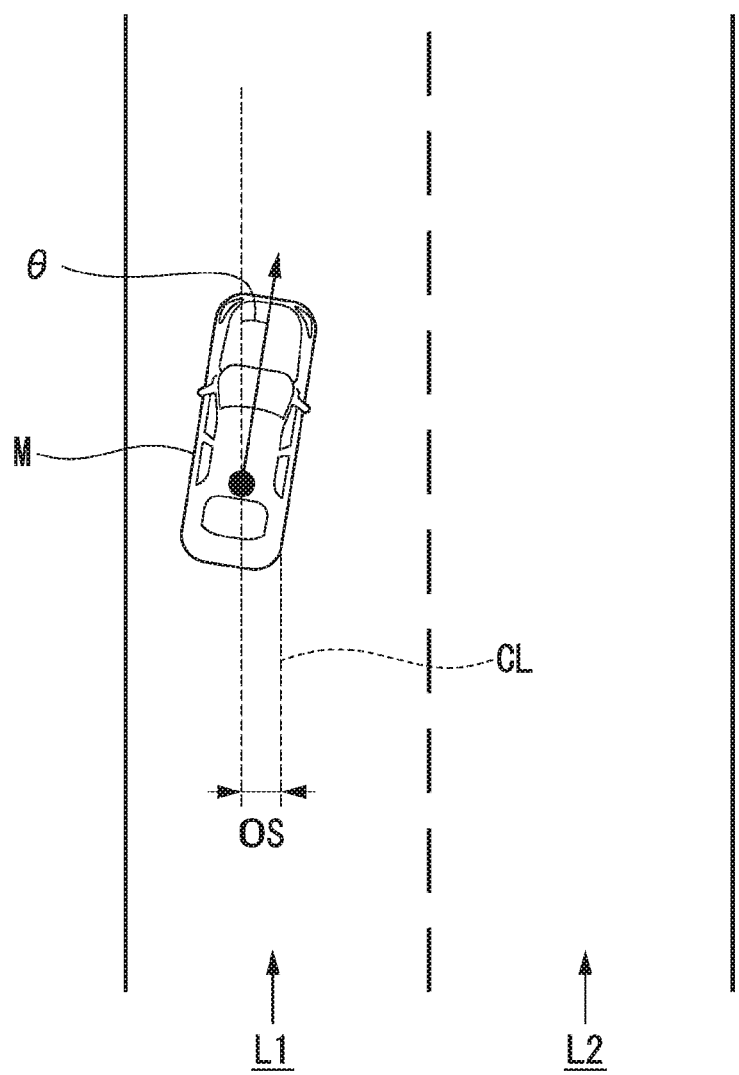
FIG. 2 is a diagram illustrating a view in which a relative position and a posture of a subject vehicle M with respect to a running lane L1 are recognized by a subject vehicle position recognizer 122.

Then, the subject vehicle position recognizer 122, for example, recognizes a position and a posture of the subject vehicle M with respect to the running lane. FIG. 2 is a diagram illustrating a view in which a relative position and a posture of a subject vehicle M with respect to a running lane L1 are recognized by the subject vehicle position recognizer 122. The subject vehicle position recognizer 122, for example, recognizes an offset OS of a reference point (for example, center of gravity) of the subject vehicle M from running lane center CL and an angle θ of an advancement direction of the subject vehicle M formed with respect to a line acquired by aligning the running lane center CL as a relative position and a posture of the subject vehicle M with respect to the running lane L1. In addition, instead of this, the subject vehicle position recognizer 122 may recognize a position of the reference point of the subject vehicle M with respect to one side end of its own lane L1 or the like as a relative position of the subject vehicle M with respect to the running lane. The relative position of the subject vehicle M recognized by the subject vehicle position recognizer 122 is provided for the recommended lane determiner 61 and the action plan generator 123.

The action plan generator 123 generates an action plan such that the subject vehicle M runs in a recommended lane determined by the recommended lane determiner 61, and surrounding situations of the subject vehicle M can be handled. The action plan is configured by events that are sequentially executed in automated driving. The automated driving represents controlling of at least one of acceleration/deceleration and steering of the subject vehicle M using the automated driving controller 100.

In the events, for example, there are a constant-speed running event in which the subject vehicle runs at a constant speed in the same running lane, a following running event in which the subject vehicle follows a vehicle running ahead, a lane-changing event in which a running lane is changed, an overtaking event in which the subject vehicle M is caused to overtake a vehicle running ahead, a merging event in which the running lane is changed by accelerating/decelerating the subject vehicle M in a merging lane for merging into a main line, a branching event in which the running lane is changed to a desired lane at a branching point or the subject vehicle M is caused to run not to deviate from the current running lane, an emergent stop event in which the subject vehicle M is emergently stopped in accordance with behaviors of surrounding vehicles and the like, a handover event for ending automated driving and switching over to manual driving, and the like. The manual driving represents that the running driving force output device 200, the brake device 210, and the steering device 220 are controlled in accordance with an operation of a vehicle occupant on the driving operator 80. In addition, there are also cases in which, during the execution of such an event, an event for avoidance is planned on the basis of the surrounding situations of the subject vehicle M (presence of surrounding vehicles and pedestrians, lane contraction according to road construction, and the like).

Figure 3:
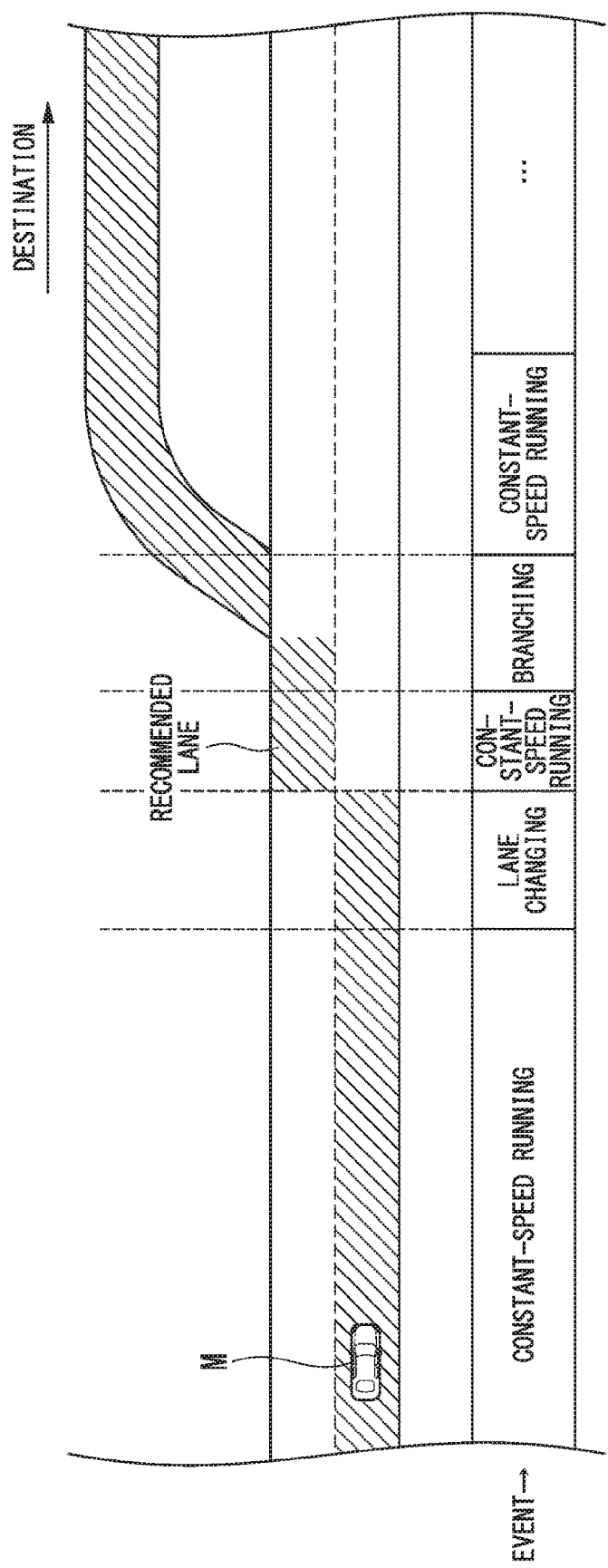
FIG. 3 is a diagram illustrating one example of an action plan generated for a certain section.

FIG. 3 is a diagram illustrating one example of an action plan generated for a certain section. As illustrated in the drawing, a recommended lane is set such that it is convenient for the subject vehicle to run along a route to a destination. The action plan generator 123 generates an action plan that is necessary for the subject vehicle M to run on a recommended lane determined by the recommended lane determiner 61. For example, the action plan generator 123 plans a lane-changing event or the like for changing the lane of the subject vehicle M to a lane after change of a recommended lane at a predetermined distance or a predetermined time at a point at which the recommended lane is switched. The predetermined distance or the predetermined time may be determined in accordance with a type of event. In addition, as illustrated in the drawing, in a case in which a lane branching from a main line is determined as a recommended lane, the action plan generator 123 plans a branching event at the branching point.

The event determiner 124 determines whether or not an event planned in advance in an action plan generated by the action plan generator 123 can be executed at a predetermined period. For example, when the subject vehicle M reaches a place at which a lane-changing event is planned, the event determiner 124 determines whether or not the lane-changing event can be executed every time the subject vehicle M runs a constant distance from the place or when a constant time elapses therefrom. For example, in a case in which a space allowing the subject vehicle M to run in a lane (an adjacent lane) that is a lane change destination cannot be secured or a case in which a surrounding vehicle is enforced to apply sudden brake in accordance with the lane change of the subject vehicle M, the event determiner 124 determines that the lane-changing event cannot be executed. Detailed description of determination conditions for execution/no-execution of the lane-changing event will be presented later with reference to a drawing.

In a case in which it is determined by the event determiner 124 that an event planned in advance in the action plan cannot be executed, the planned event may be changed to a different event. For example, in a case in which it is determined that a lane-changing event cannot be executed, the event determiner 124 changes the lane-changing event to a constant-speed running event or a following running event and maintains the subject vehicle M to run in the current lane. In addition, the event determiner 124 may change lanes through manual driving instead of performing lane change through automated driving by changing a lane-changing event to a handover event.

In a case in which it is determined by the event determiner 124 that a planned event can be executed, the trajectory generator 125 generates a target trajectory along which the subject vehicle M will run in the future in accordance with the planned event. The target trajectory, for example, includes an acceleration/deceleration element and a steering element.

Figure 4:
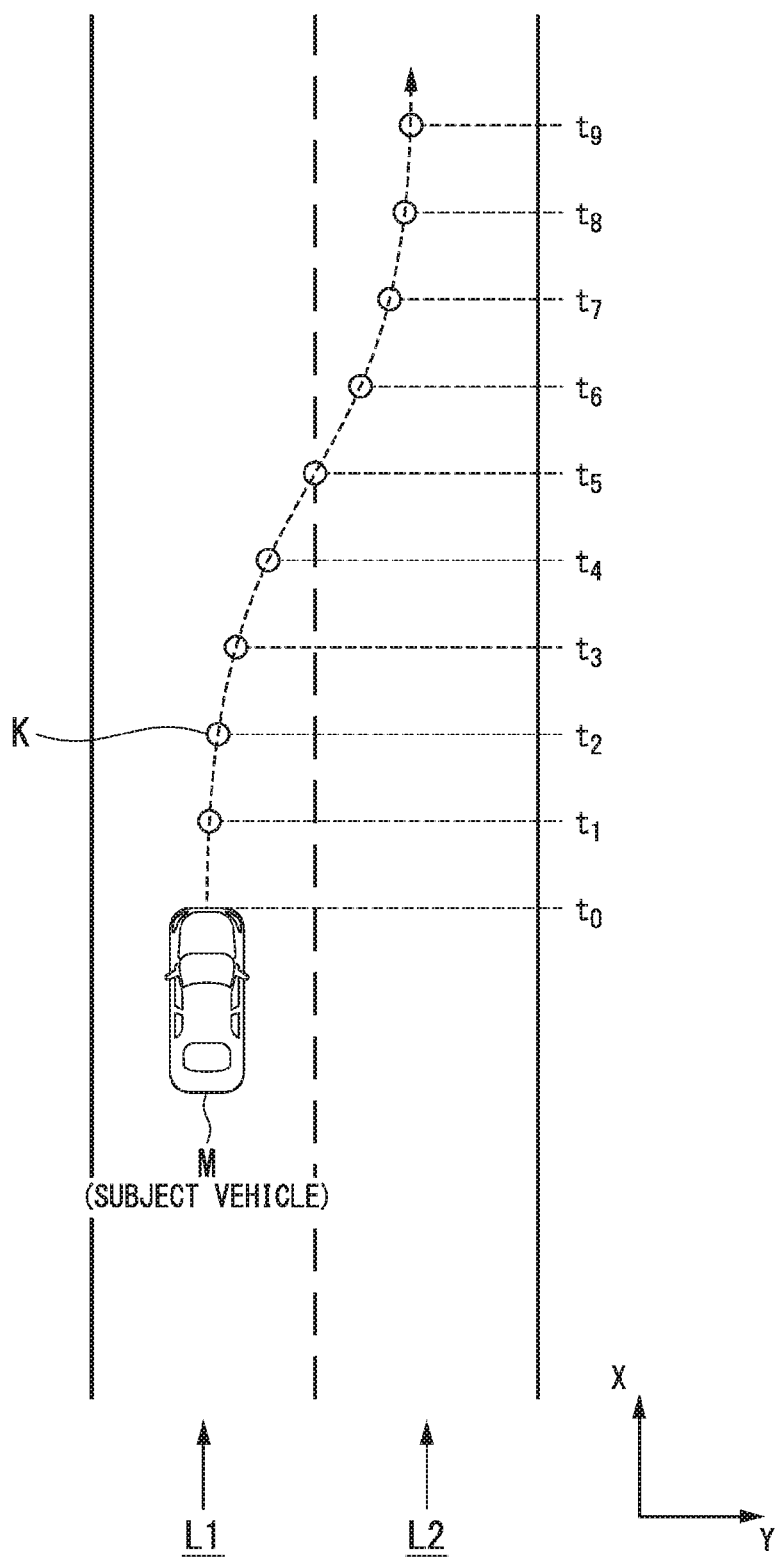
FIG. 4 is a diagram illustrating one example of a target trajectory generated at the time of a lane-changing event.

FIG. 4 is a diagram illustrating one example of a target trajectory generated at the time of a lane-changing event. As illustrated in the drawing, for example, by setting a plurality of reference times in the future for every predetermined sampling time (for example, about a fraction of [sec]) ($t_1$ to $t_9$ illustrated in the drawing), the target trajectory is generated as a set of target points (trajectory points K) to be reached at such reference times. For this reason, in a case in which an interval between trajectory points K is large, it represents that a long distance is run within a certain time. In other words, in a case in which an interval between trajectory points K is large, it represents that a section between the trajectory points K is run at a high speed (a speed higher than a reference speed). In addition, in a case in which an angle formed by trajectory points K in the advancement direction of the vehicle is large, it represents that large steering is performed in a section between the trajectory points K.

For example, the trajectory generator 125 generates a plurality of candidates for a target trajectory and selects a target trajectory that is optimal at that time point on the basis of points of view of safety and efficiency.

Before description of the second controller 140, the running driving force output device 200, the brake device 210, and the steering device 220 will be described.

The running driving force output device 200 outputs a running driving force (torque) for allowing a vehicle to run the driving wheels. The running driving force output device 200, for example, includes a combination of an internal combustion engine, an electric motor, a transmission gear, and the like and an ECU controlling such components. The ECU controls the components described above on the basis of information input from the running controller 141 or information input from the driving operator 80.

The brake device 210, for example, includes a brake caliper, a cylinder delivering hydraulic pressure to the brake caliper, an electric motor generating hydraulic pressure in the cylinder, and a brake ECU. The brake ECU controls the electric motor on the basis of the information input from the running controller 141 or the information input from the driving operator 80 such that a brake torque corresponding to a braking operation is output to each vehicle wheel. The brake device 210 may include a mechanism that delivers a hydraulic pressure generated in accordance with an operation for a brake pedal included in the driving operator 80 to the cylinder through a master cylinder as a backup. In addition, the brake device 210 is not limited to the configuration described above and may be an electronic control-type hydraulic brake device that delivers a hydraulic pressure of the master cylinder to the cylinder by controlling an actuator on the basis of information input from the running controller 141.

The steering device 220, for example, includes a steering ECU and an electric motor. The electric motor, for example, changes the direction of the steering wheel by applying a force to a rack and pinion mechanism. The steering ECU changes the direction of the steering wheel by driving the electric motor in accordance with information input from the running controller 141 or information input from the driving operator 80.

The second controller 140 includes a running controller 141. The running controller 141 controls the running driving force output device 200 and one or both of the brake device 210 and the steering device 220 such that the subject vehicle M passes through a target trajectory generated by the trajectory generator 125 at a planned time.

For example, in accordance with an interval of trajectory points K defined as a target trajectory, the running controller 141 determines an amount of control of an ECU (for example, a degree of opening, a shift level, and the like of the engine) of the running driving force output device 200 and an amount of control of a brake ECU (for example, an amount of driving and the like of an electric motor and other actuators) of the brake device 210. In addition, the running controller 141 determines an amount of control of an electric motor of the steering device 92 in accordance with an angle formed by the advancement direction of the subject vehicle M at the trajectory point K at a certain reference time $t_i$ and the direction of the trajectory point K at a next reference time $t_{i+1}$ of this reference time $t_i$.

Figure 5:
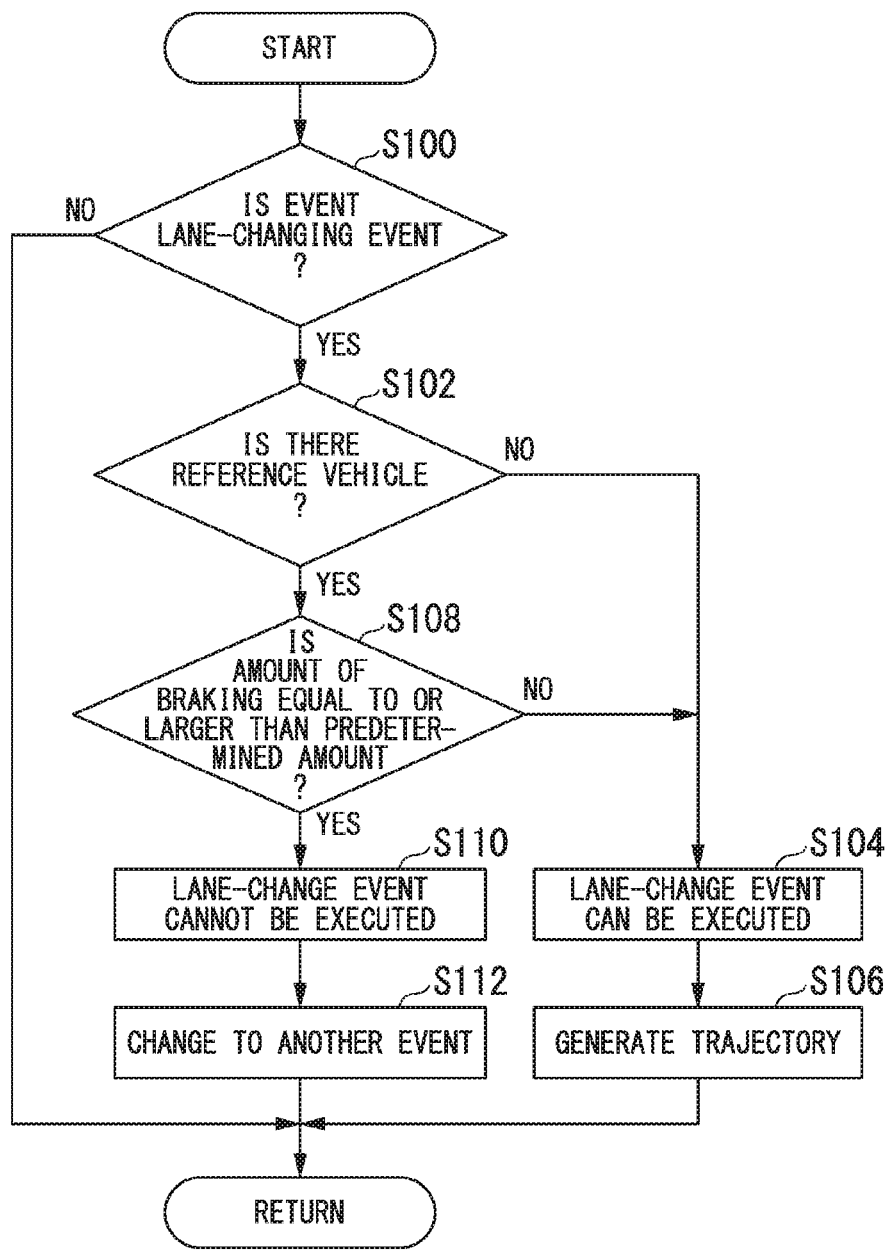
FIG. 5 is a flowchart illustrating one example of a process executed by an automated driving controller 100.

Hereinafter, a series of processes performed by the automated driving controller 100 will be described using a flowchart. FIG. 5 is a flowchart illustrating one example of a process executed by the automated driving controller 100. The process of this flowchart, for example, is repeatedly performed using a predetermined cycle time during automated driving.

First, the event determiner 124 identifies an event executed at the current time point among a plurality of events planned as an action plan and determines whether or not the identified event is a lane-changing event (Step S100). In a case in which the identified event is not a lane-changing event, the process of this flowchart ends.

In a case in which the identified event is the lane-changing event, the event determiner 124 determines whether or not a surrounding vehicle positioned to the rear of the subject vehicle M (hereinafter, referred to as a reference vehicle mref) is present on a lane that is a destination of the lane change designated in the lane-changing event among surrounding vehicles recognized by the external system recognizer 121 (Step S102). The reference vehicle mref is a vehicle that is assumed to be positioned to the rear of the subject vehicle M after lane change. When seen from the reference vehicle mref side, a vehicle cutting in immediately before the reference vehicle is the subject vehicle M.

In a case in which there is no reference vehicle mref, the event determiner 124 determines that the lane-changing event can be executed (Step S104). Next, the trajectory generator 125 generates a target trajectory for moving the subject vehicle M from its own lane to a lane designated in the lane-changing event as illustrated in FIG. 4 (Step S106).

On the other hand, in a case in which it is determined that there is a reference vehicle mref, the event determiner 124 determines whether or not a degree of braking predicted to be generated in the reference vehicle mref due to lane change of the subject vehicle M is equal to or higher than a threshold (Step S108).

For example, the event determiner 124 determines whether or not the degree of braking of the reference vehicle mref is equal to or higher than a threshold by deriving a braking distance D on the basis of a relative speed $V_{re}$ between the subject vehicle M and the reference vehicle mref and comparing this braking distance D with a current relative distance $D_{re}$ between the subject vehicle M and the reference vehicle mref. The braking distance D, for example, in a case in which the reference vehicle mref starts braking (deceleration) in response to lane change of the subject vehicle M, is a distance predicted to be traveled by the reference vehicle mref until the speed of the reference vehicle mref becomes the same degree as the speed of the subject vehicle M. The same degree, for example, represents that two numerical values that are comparison targets coincide with each other within the range of error of several [%]. In other words, the same degree represents that two numerical values that are comparison targets are the same, or a difference between two numerical values is equal to or smaller than an allowed value. In the example described above, the same degree represents that the speed of the reference vehicle mref and the speed of the subject vehicle M coincide with each other within the range of error of several [%].

For example, the event determiner 124 derives a braking distance D of the reference vehicle mref on the basis of the relative speed $V_{re}$ between the subject vehicle M and the reference vehicle mref by referring to information (for example, a map, a numerical expression, or the like) in which a relationship between the relative speed $V_{re}$ between the subject vehicle M and the reference vehicle mref and the braking distance D of the reference vehicle mref is determined.

Figure 6:
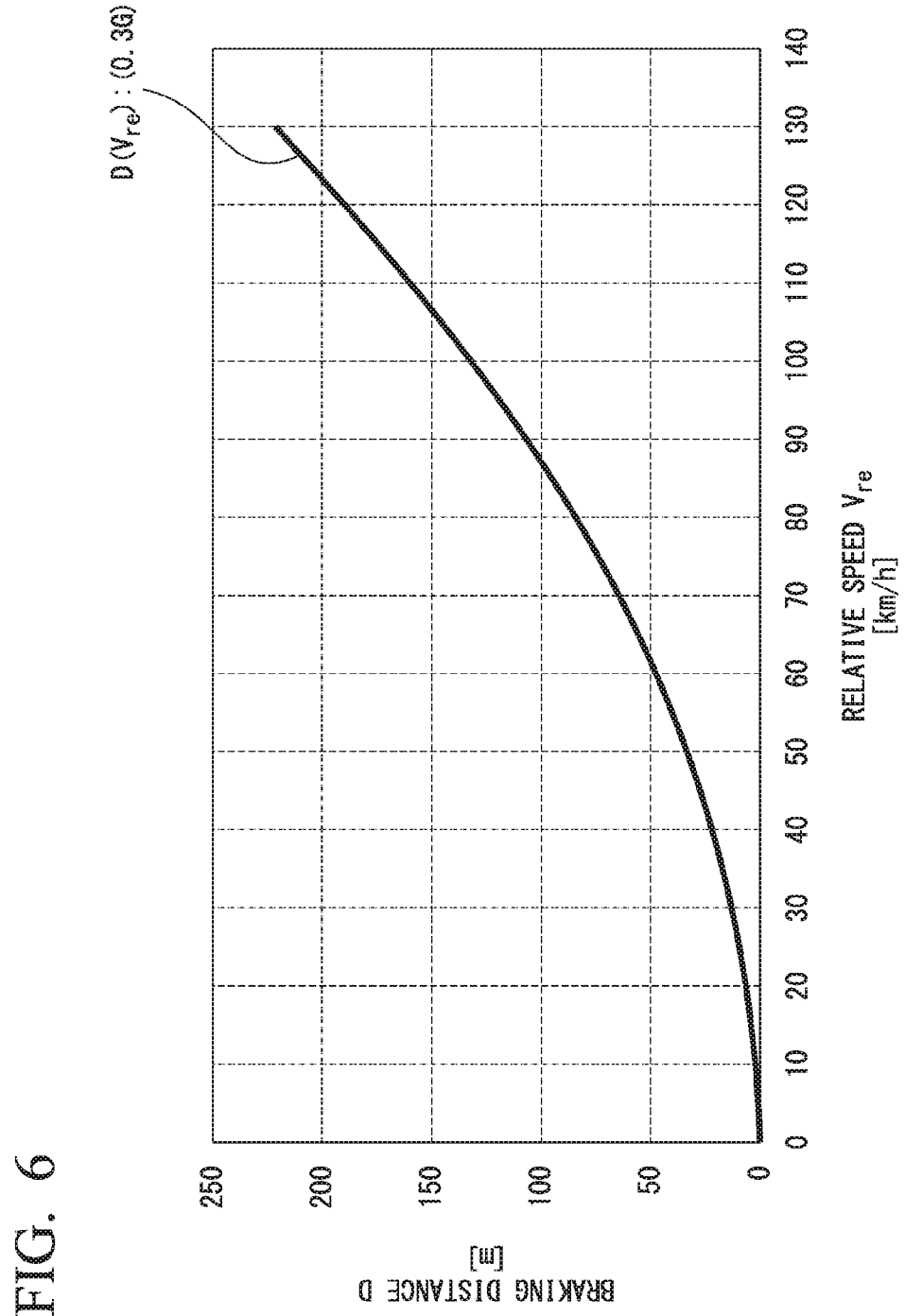
FIG. 6 is a diagram illustrating a relationship between a relative speed $V_{re}$ between a subject vehicle M and a reference vehicle mref and a braking distance D of the reference vehicle mref as a map.

FIG. 6 is a diagram illustrating a relationship between a relative speed $V_{re}$ between a subject vehicle M and a reference vehicle mref and a braking distance D of the reference vehicle mref as a map. As illustrated in the drawing as an example, the braking distance D tends to become longer in accordance with an increase in the relative speed $V_{re}$ and tends to become shorter in accordance with a decrease in the relative speed $V_{re}$. Such a braking distance D may be predicted in advance on the basis of a kinetic model for braking with a constant braking force. In the illustrated example, generally, a braking distance D acquired when deceleration is started with a braking force of about 0.3 [G] that becomes a boundary for determining sudden deceleration is illustrated. Accordingly, for example, a braking distance D of the reference vehicle mref when deceleration with a braking force of 0.3 [G] is assumed can be acquired on the basis of the relative speed $V_{re}$ between of the subject vehicle M and the reference vehicle mref at the time of determining executability of the lane-changing event. In addition, a relationship between the relative speed $V_{re}$ and the braking distance D represented in the map may be represented by a function of the braking distance D having the relative speed $V_{re}$ as its variable or may be represented by a table corresponding to this function. The map, the function, or the table described above is one example of "correspondence information."

When the braking distance D acquired from the map is shorter than a relative distance $D_{re}$ between the subject vehicle M and the reference vehicle mref at the time of determining executability of the lane-changing event, also in a case in which the subject vehicle M performs lane change, the reference vehicle mref can continue running without the reference vehicle mref rapidly approaching the subject vehicle M at a time point in the future. In other words, the reference vehicle mref can continue running without requiring a braking force of 0.3 [G] or more causing sudden deceleration. In this case, the event determiner 124 determines that the degree of braking of the reference vehicle mref is lower than the threshold (0.3 [G]).

On the other hand, when the braking distance D acquired from the map is equal to or longer than the relative distance $D_{re}$ between the subject vehicle M and the reference vehicle mref at the time of determining executability of the lane-changing event, in a case in which the subject vehicle M performs lane change, the reference vehicle mref overtakes the subject vehicle M at a time point in the future, and accordingly, a braking force of 0.3 [G] or more causing sudden deceleration is necessary. In this case, the event determiner 124 determines that the degree of braking of the reference vehicle mref is equal to higher than the threshold (0.3 [G]).

Figure 7A:
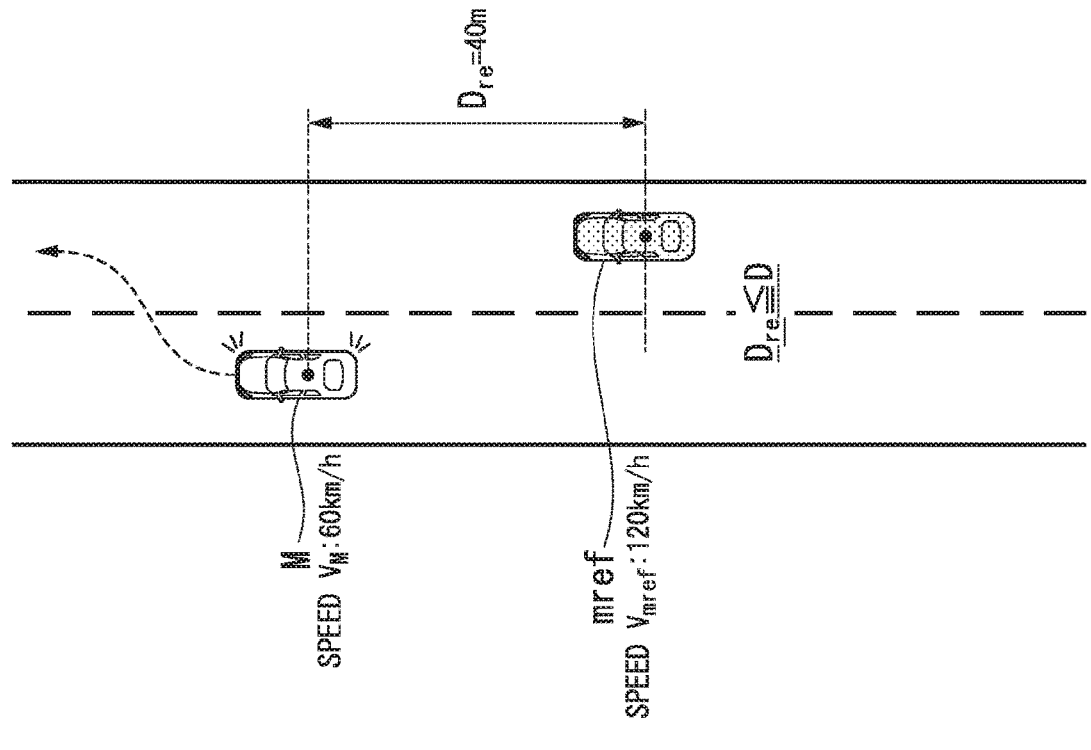
FIGS. 7A and 7B are a diagram illustrating one example of a relative relationship between a subject vehicle M and a reference vehicle mref at the time of a lane-changing event.
Figure 7B:
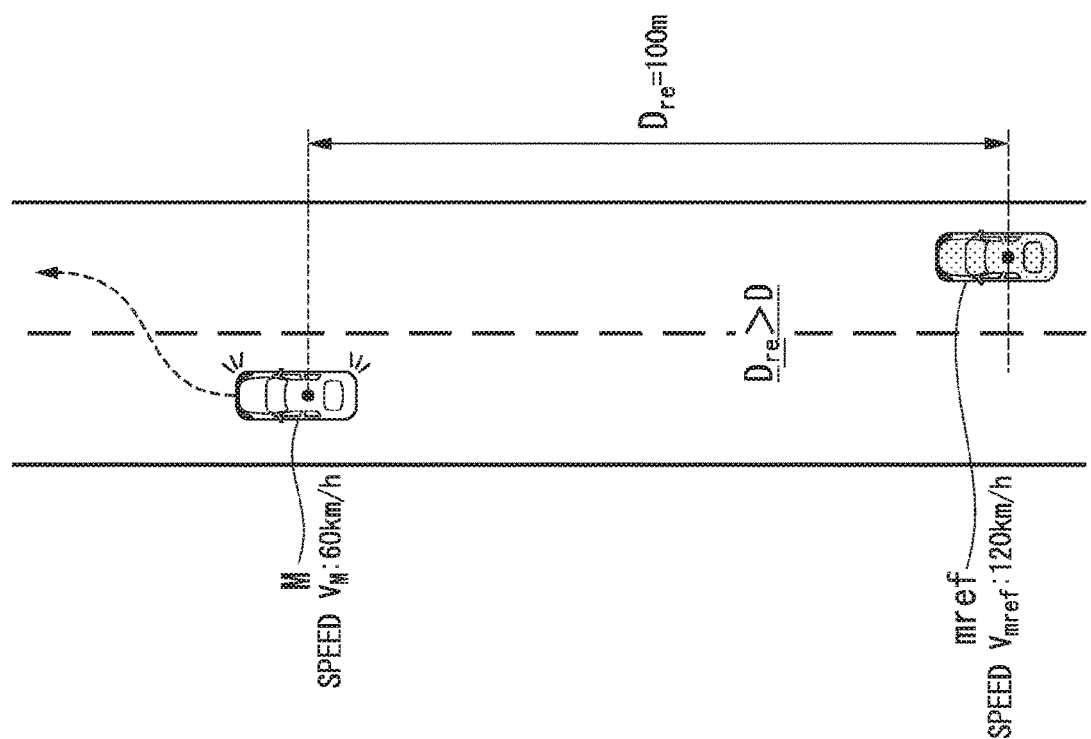

FIGS. 7A and 7B are a diagram illustrating one example of a relative relationship between a subject vehicle M and a reference vehicle mref at the time of a lane-changing event. A situation illustrated in 7A in the drawing represents that the speed VM of the subject vehicle M is 60 [km/h], the speed $V_{mref}$ of the reference vehicle mref is 120 [km/h], and a relative distance $D_{re}$ between such vehicles is 100 [m]. In this case, since the relative speed $V_{re}$ between the subject vehicle M and the reference vehicle mref is 60 [km/h], it is determined that the braking distance D is about 50 [m] from the map illustrated in FIG. 6. Since the braking distance D acquired from the map is less than the relative distance $D_{re}$ ($D_{re}$>D), the event determiner 124 determines that the lane-changing event can be executed.

In addition, a situation illustrated in FIG. 7B in the drawing represents that the speed $V_M$ of the subject vehicle M is 60 [km/h], the speed $V_{mref}$ of the reference vehicle mref is 120 [km/h], and a relative distance $D_{re}$ between such vehicles is 40 [m]. In this case, since the relative speed $V_{re}$ between the subject vehicle M and the reference vehicle mref is 60 [km/h] as described above, the braking distance D acquired from the map illustrated in FIG. 6 is about 50 [m]. Since the braking distance D acquired from the map is equal to or longer than the relative distance $D_{re}$ ($D_{re}$≤D), the event determiner 124 determines that the lane-changing event cannot be executed.

Figure 8A:
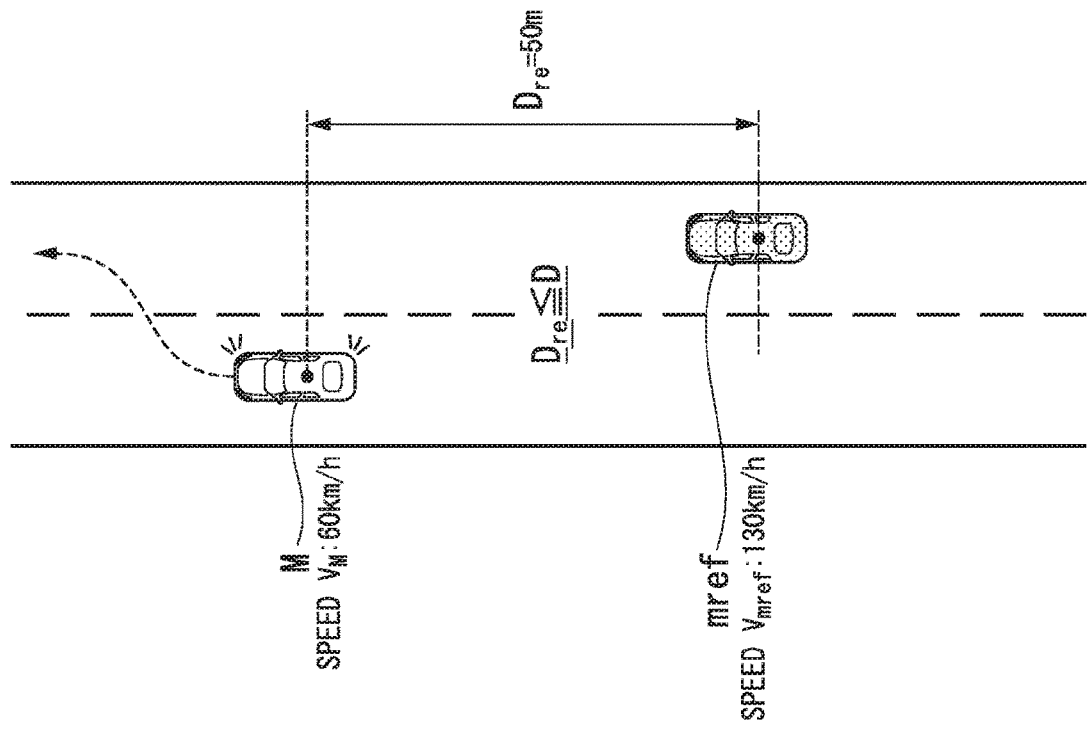
FIGS. 8A and 8B are a diagram illustrating another example of a relative relationship between a subject vehicle M and a reference vehicle mref at the time of a lane-changing event.
Figure 8B:
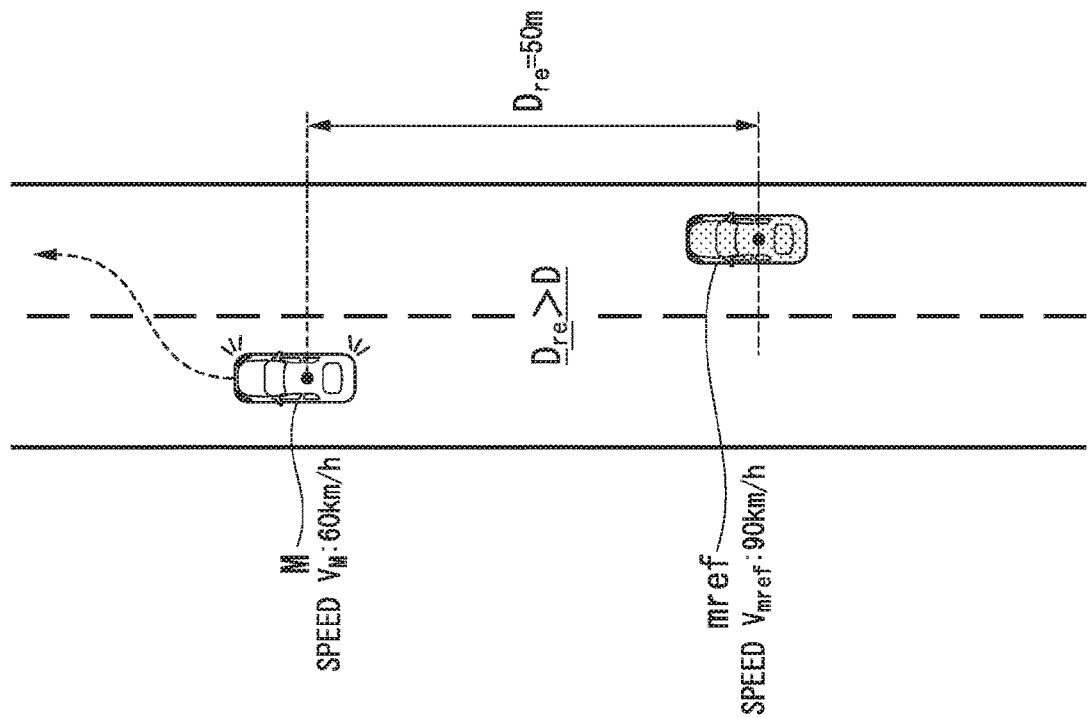

FIGS. 8A and 8B are a diagram illustrating another example of a relative relationship between a subject vehicle M and a reference vehicle mref at the time of a lane-changing event. A situation illustrated in FIG. 8A in the drawing represents that the speed $V_M$ of the subject vehicle M is 60 [km/h], the speed $V_{mref}$ of the reference vehicle mref is 90 [km/h], and a relative distance $D_{re}$ between such vehicles is 50 [m]. In this case, since the relative speed $V_{re}$ between the subject vehicle M and the reference vehicle mref is 30 [km/h], the braking distance D acquired from the map illustrated in FIG. 6 is about 20 [m]. Since the braking distance D acquired from the map is less than the relative distance $D_{re}$ ($D_{re}>D$), the event determiner 124 determines that the lane-changing event can be executed.

In addition, a situation illustrated in FIG. 8B in the drawing represents that the speed $V_M$ of the subject vehicle M is 60 [km/h], the speed $V_{mref}$ of the reference vehicle mref is 130 [km/h], and a relative distance $D_{re}$ between such vehicles is 50 [m]. In this case, since the relative speed $V_{re}$ between the subject vehicle M and the reference vehicle mref is 70 [km/h] as described above, the braking distance D acquired from the map illustrated in FIG. 6 is about 70 [m]. Since the braking distance D acquired from the map is equal to or longer than the relative distance $D_{re}$ ($D_{re} \leq D$), the event determiner 124 determines that the lane-changing event cannot be executed.

Here, the description of the flowchart illustrated in FIG. 5 will be continued. In a case in which the degree of braking of the reference vehicle mref becomes lower than the threshold in accordance with the lane change of the vehicle M, the event determiner 124 causes the process to proceed to the process of S104.

On the other hand, in a case in which the degree of braking of the reference vehicle mref becomes equal to or higher than the threshold in accordance with the lane change of the vehicle M, the event determiner 124 determines that a lane-changing event cannot be executed. Then, the event determiner 124 changes the lane-changing event to another event such as a constant-speed running event or a following running event (Step S112). In this way, the process of this flowchart ends.

In addition, in the embodiment described above, when the braking distance D is compared with the relative distance $D_{re}$, the event determiner 124 may add a margin α to the braking distance D. The margin α is a value in the dimension of a distance based on a time (in other words, a vehicle head time) acquired by dividing a distance from the position of the reference vehicle mref to the position of the subject vehicle M at a lane change time point by the speed Vmref of the reference vehicle mref at the time point.

Figure 9:
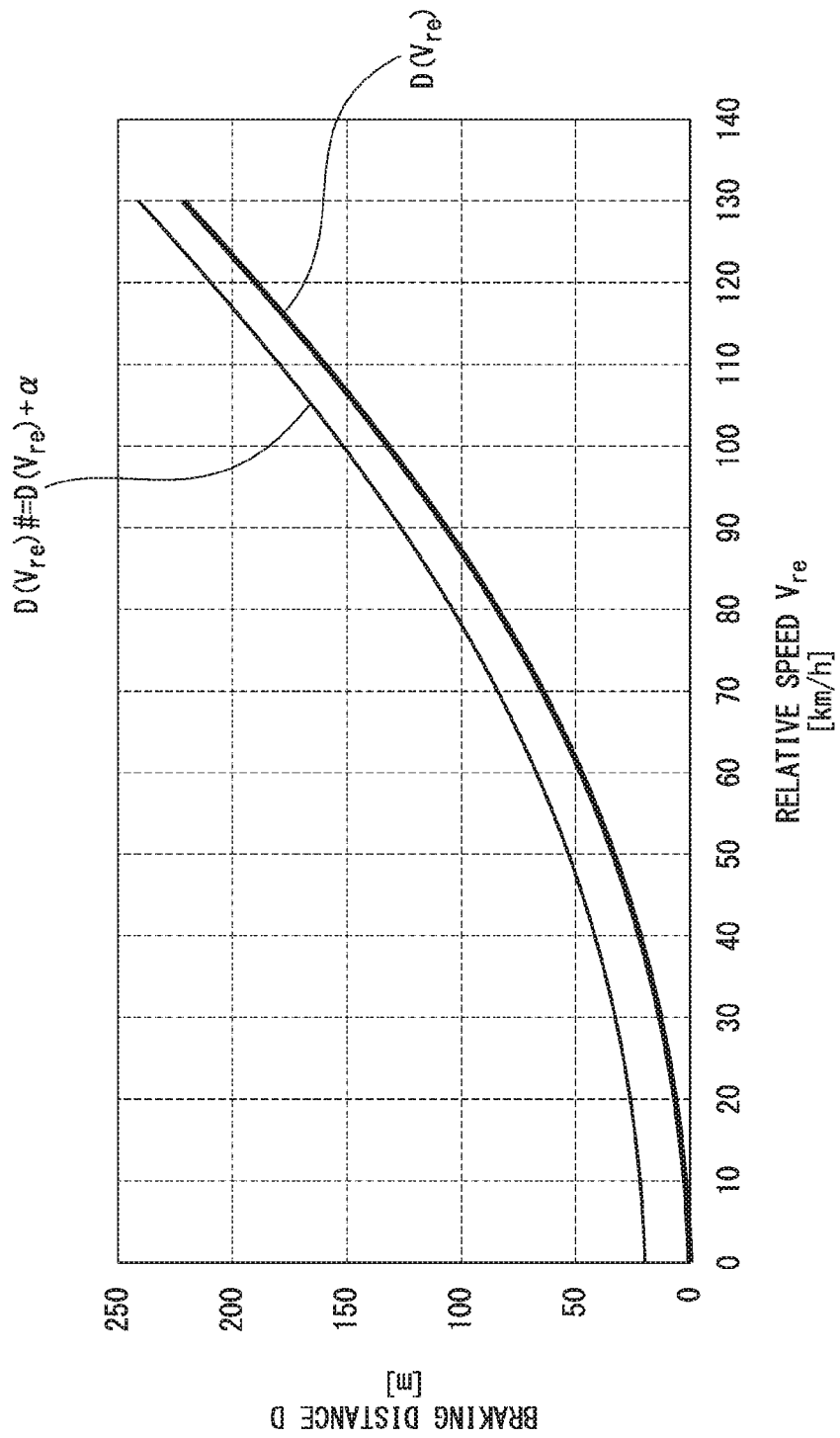
FIG. 9 is a diagram illustrating a relationship between a relative speed $V_{re}$ between a subject vehicle M and a reference vehicle mref and a braking distance D of the reference vehicle mref to which a margin α is added as a map.

FIG. 9 is a diagram illustrating a relationship between a relative speed $V_{re}$ between a subject vehicle M and a reference vehicle mref and a braking distance D of the reference vehicle mref to which a margin α is added as a map. As illustrated in the drawing, by adding the margin α, the braking distance D of the reference vehicle mref that is predicted in the future is increased. In this way, the condition for permission of the lane-changing event is strengthened, and accordingly, the event may be easily stopped for safety when the braking distance D and the relative distance $D_{re}$ are of the same degree. As a result, lane change with greater consideration for surrounding vehicles can be performed.

In addition, in the example illustrated in the drawing, although the margin α is configured as being constant regardless of the relative speed $V_{re}$, the configuration is not limited thereto, and the margin α may be increased or decreased in accordance with the relative speed $V_{re}$ or the situation of the road surface of a destination of the lane change. For example, the margin α may be increased as the relative speed $V_{re}$ becomes higher, and the margin α may be increased in a case in which the road surface is wet when it is raining or the like. In addition, in a case in which a relationship between the relative speed $V_{re}$ and the braking distance D is represented using a function, the margin α described above may be represented using a constant term and the like.

In addition, in the map illustrated in FIG. 6, although the braking distance D is derived on the basis of a kinetic model when a braking force of about 0.3 [G] is given, the deriving thereof is not limited thereto. For example, the braking distance D may be derived in accordance with a plurality of kinetic models in which braking forces of a plurality of types such as 0.1 [G], 0.2 [G], and 0.3 [G] are assumed to be given.

Figure 10:
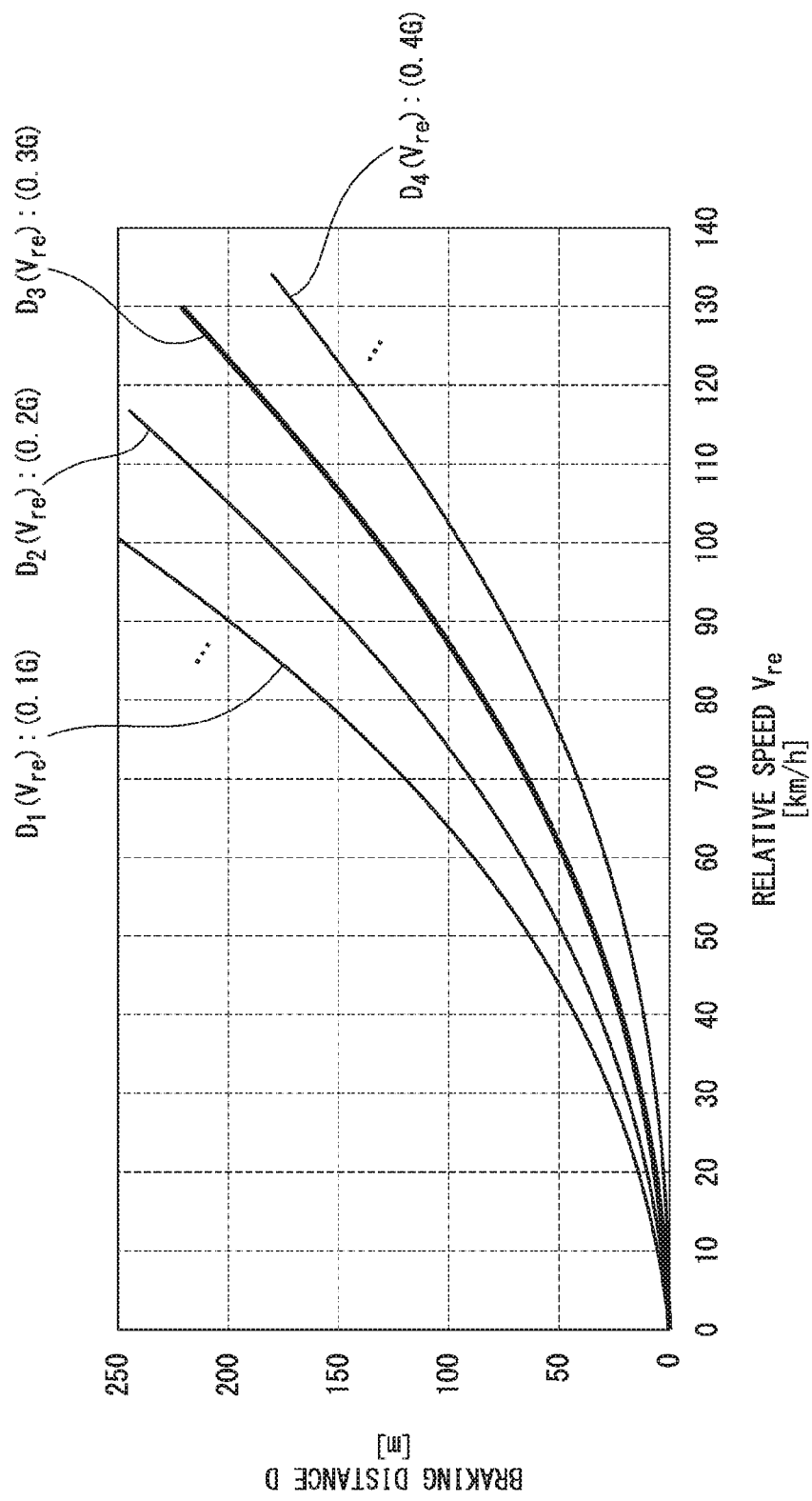
FIG. 10 is a diagram illustrating relationships between a relative speed $V_{re}$ between a subject vehicle M and a reference vehicle mref and braking distances D of a plurality of reference vehicles mref as a map.

FIG. 10 is a diagram illustrating relationships between a relative speed $V_{re}$ between a subject vehicle M and a reference vehicle mref and the braking distances D of a plurality of reference vehicles mref as a map. $D_1$ illustrated in the drawing represents a braking distance when deceleration is started with a braking force of 0.1 [G], $D_2$ represents a braking distance when deceleration is started with a braking force of 0.2 [G], $D_3$ represents a braking distance when deceleration is started with a braking force of 0.3 [G], and $D_4$ represents a braking distance when deceleration is started with a braking force of 0.4 [G]. For example, the event determiner 124 may change the braking distance D to be referred to in accordance with types of surrounding vehicles of which states are recognized by the external system recognizer 121. In this way, the event determiner 124, for example, may derive a braking distance D in accordance with a kinetic model assuming a low braking force of 0.1 or 0.2 [G] for a vehicle not applying a large braking force such as a two-wheel vehicle or a truck.

In addition, in the embodiment described above, the event determiner 124 may select one kinetic model in accordance with the necessity for lane change from a plurality of kinetic models having different assumed braking forces. For example, in a case in which lane change according to an event is not performed as in the case of a branching event or a merging event, the necessity for lane change increases as the event has a higher likelihood of the subject vehicle M deviating from a route toward a destination. In contrast to this, for an event that does not necessarily need to be performed, the necessity for lane change becomes low. For example, the event determiner 124 may derive a braking distance D by applying a kinetic model having a large braking force assumed to be 0.3 [G] or 0.4 [G] in a case in which the necessity for lane change is low and derive a braking distance D by applying a kinetic model having a small braking force assumed to be 0.1 [G] or 0.2 [G] in a case in which the necessity for lane change is high.

According to the first embodiment described above, the external system recognizer 121 that recognizes one or more other vehicles present in the vicinity of the subject vehicle M, the running controller 141 that performs lane change of the subject vehicle M by controlling at least steering of the subject vehicle, and the event determiner 124 that determines whether or not the degree of braking predicted to be generated in the reference vehicle mref due to the lane change of the subject vehicle M is equal to or higher than a threshold on the basis of a relative relationship between a reference vehicle mref present in a lane that is a destination of the lane change among the one or more other vehicles recognized by the external system recognizer 121 and the subject vehicle M in a case in which the lane change is performed are included, and the running controller 141 stops the lane change in a case in which it is determined by the event determiner 124 that the degree of braking is equal to or higher than the threshold, whereby lane change in consideration of the surrounding vehicles can be performed.

Second Embodiment

Hereinafter, a second embodiment will be described. In the second embodiment, in a case in which it is determined that a lane-changing event can be executed, and lane change is started, when another new vehicle is recognized in a lane that is a destination of the lane change in the process of performing the lane change, determination of whether or not a degree of braking is equal to or higher than a threshold for the another recognized vehicle is repeated, which is different from the first embodiment described above. Hereinafter, points different from the first embodiment will be focused on in the description, and description of functions and the like shared by those according to the first embodiment will be omitted.

In a case in which a new reference vehicle mref is recognized by an external system recognizer 121 in the process of performing lane change, an event determiner 124 according to the second embodiment may determine whether or not the lane-changing event can be continued on the basis of a relative relationship with the new reference vehicle mref that has been recognized. For example, in a case in which the event determiner 124 determines that a lane-changing event can be executed, a trajectory generator 125 generates a target trajectory. Accordingly, under the control of a running controller 141, a subject vehicle M starts to perform lane change to an adjacent lane along the target trajectory. In the process of this lane change, in a case in which it is newly recognized by the external system recognizer 121 that another reference vehicle mref comes near from the side to the rear of the adjacent lane that is the destination of the lane change, the event determiner 124 determines whether or not the lane-changing event can be continued on the basis of a relative relationship with the reference vehicle mref that has been newly recognized.

Figure 11:
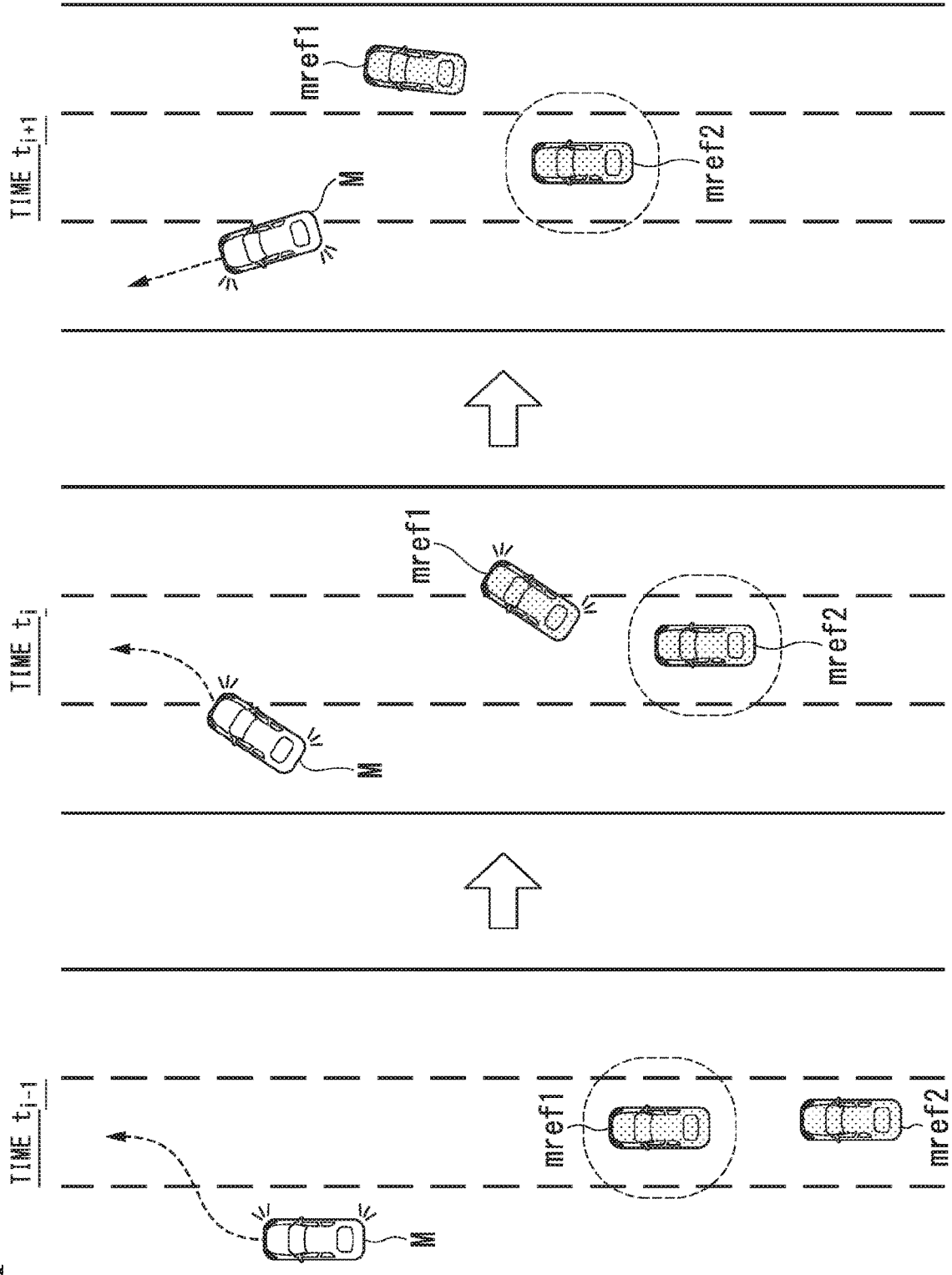
FIG. 11 is a diagram illustrating one example of a view in which it is determined whether or not a lane-changing event can be continued.

FIG. 11 is a diagram illustrating one example of a view in which it is determined whether or not a lane-changing event can be continued. As illustrated in the drawing, for example, in a case in which it is determined that the degree of braking of the reference vehicle mref1 is lower than the threshold, and it is determined that a lane-changing event can be executed, a subject vehicle M starts lane change. At this time, for example, in a case in which a reference vehicle mref2 positioned to the rear of the reference vehicle mref1 is newly recognized in accordance with movement of the reference vehicle mref1 to another lane, the event determiner 124 determines whether or not the degree of braking of the reference vehicle mref2 that has been newly recognized is equal to or higher than a threshold. In a case in which the degree of braking of the reference vehicle mref2 is equal to or higher than the threshold, the event determiner 124 determines that the lane-changing event cannot be continued and changes the event to another event. In accompaniment with this, the trajectory generator 125 generates a target trajectory for moving the subject vehicle M to the original lane before change. In this way, the continuation/non-continuation of an event is determined even after the lane-changing event is permitted temporarily, whereby lane change with greater consideration of surrounding vehicles can be performed.

According to the second embodiment described above, by determining the continuation/non-continuation of the event even after the lane-changing event is permitted once, lane change with greater consideration of surrounding vehicles can be performed.

Hardware Configuration

Figure 12:
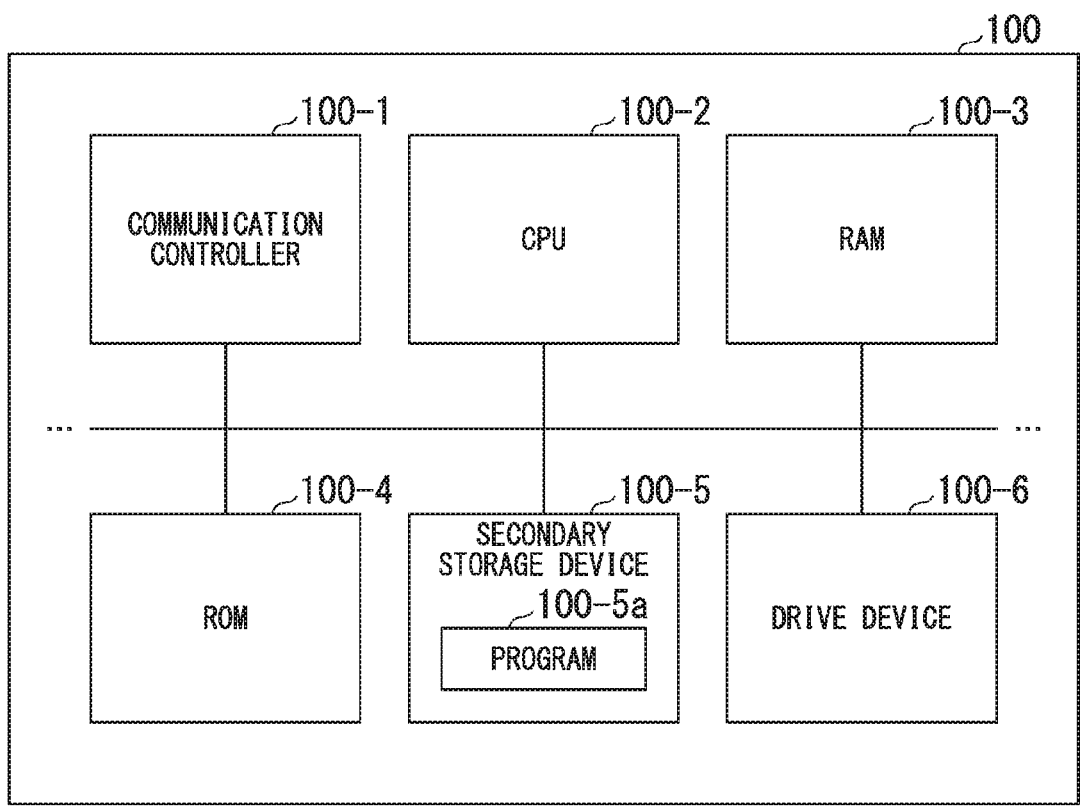
FIG. 12 is a diagram illustrating one example of the hardware configuration of an automated driving controller 100 according to an embodiment.

The automated driving controller 100 of the vehicle control system 1 according to the embodiment described above, for example, is realized by a hardware configuration as illustrated in FIG. 12. FIG. 12 is a diagram illustrating one example of the hardware configuration of the automated driving controller 100 according to an embodiment.

The automated driving controller 100, for example, has a configuration in which a communication controller 100-1, a CPU 100-2, a RAM 100-3, a ROM 100-4, a secondary storage device 100-5 such as a flash memory or an HDD, and a drive device 100-6 are interconnected through an internal bus or a dedicated communication line. A portable storage medium such as an optical disc is loaded into the drive device 100-6. A program 100-5*a* stored in the secondary storage device 100-5 is developed into the RAM 100-3 by a DMA controller (not illustrated in the drawing) or the like and is executed by the CPU 100-2, whereby the functional units (the first controller 120 and the second controller 140) of the automated driving controller 100 are realized. In addition, the program referred to by the CPU 100-2 may be stored in the portable storage medium loaded into the drive device 100-6 or may be downloaded from another device through a network NW.

The embodiment described above may be represented as below.

A vehicle control system includes a storage storing information and a processor executing a program stored in the storage, and the processor, by executing the program, is configured to execute: recognizing one or more other vehicles present in the vicinity of a subject vehicle; performing lane change control of performing lane change of the subject vehicle by controlling at least steering of the subject vehicle; in a case in which the lane change control is performed, determining whether or not a degree of braking predicted to be generated in a reference vehicle due to the lane change of the subject vehicle is equal to or higher than a threshold on the basis of a relative relationship between the reference vehicle present in a lane that is a destination of lane change among the one or more other vehicles that have been recognized as above and the subject vehicle; and stopping the lane change control in a case in which it is determined that the degree of braking is equal to or higher than the threshold.

As above, although a form of the present invention has been described using embodiments, the present invention is not limited to such embodiments at all, and various modifications and substitutions can be applied within a range not departing from the concept of the present invention.

DESCRIPTION OF REFERENCE NUMERALS

1 vehicle control system
10 camera
12 radar device
14 finder
16 object-recognizing device
20 communication device
30 HMI
40 vehicle sensor
50 navigation device
51 GNSS receiver
52 navigation HMI
53 route determiner
54 first map information
60 MPU
61 recommended lane determiner
62 second map information
80 driving operator
100 automated driving controller
120 first controller
121 external system recognizer 122 subject vehicle position recognizer
123 action plan generator
124 event determiner
125 trajectory generator
140 second controller
141 running controller
200 running driving force output device
210 brake device
220 steering device

What is claimed is:

1. A vehicle control system, comprising:
a recognizer that recognizes one or more other vehicles present in the vicinity of a subject vehicle;
a running controller that performs lane change control of performing lane change of the subject vehicle by controlling at least steering of the subject vehicle; and
a determiner that determines whether or not a degree of braking predicted to be generated in a reference vehicle due to the lane change of the subject vehicle is equal to or higher than a threshold on the basis of a relative relationship between the reference vehicle present in a lane that is a destination of the lane change among the one or more other vehicles that have been recognized by the recognizer and the subject vehicle in a case in which the lane change control is performed by the running controller,
wherein the determiner derives a braking distance predicted to be run by the reference vehicle until a speed of the reference vehicle decelerating in accordance with braking becomes the same degree of a speed of the subject vehicle on the basis of a relative speed between the subject vehicle and the reference vehicle,
wherein the determiner compares the derived braking distance with a relative distance between the subject vehicle and the reference vehicle and determines that the degree of braking is equal to higher than the threshold in a case in which the braking distance is equal to or longer than the relative distance,
wherein the running controller stops the lane change control in a case in which it is determined by the determiner that the degree of braking is equal to or higher than the threshold,
wherein the determiner makes the braking distance larger as a necessity for lane change of the subject vehicle is higher,
wherein the determiner makes the braking distance smaller as the necessity for lane change of the subject vehicle is lower, and
a first lane change is higher necessity than a second lane change, the first lane change being a lane change associated with a branch or merge according to a predetermined destination, the second lane change being a lane change associated with overtaking another vehicle in front of the subject vehicle.

2. The vehicle control system according to claim 1, wherein the determiner derives the braking distance at a time point at which the lane change control is performed by the running controller using correspondence information for acquiring the braking distance in a case in which it is assumed that braking is performed with a constant braking force.

3. The vehicle control system according to claim 2, wherein the determiner selects one piece of the correspondence information among a plurality of pieces of the correspondence information in accordance with an absolute speed of at least one of the subject vehicle and the reference vehicle.

4. The vehicle control system according to claim 1, wherein the determiner changes the threshold in accordance with a situation of the lane that is the destination of the lane change.

5. The vehicle control system according to claim 1, wherein the determiner derives the braking distance on the basis of a situation of the lane that is the destination of the lane change.

6. The vehicle control system according to claim 1, wherein the determiner changes the threshold in accordance with an absolute speed of at least one of the subject vehicle and the reference vehicle.

7. The vehicle control system according to claim 1, wherein the determiner derives the braking distance on the basis of an absolute speed of at least one of the subject vehicle and the reference vehicle.

8. The vehicle control system according to claim 1, wherein the determiner changes the threshold in accordance with a type of the reference vehicle.

9. The vehicle control system according to claim 1, wherein the determiner derives the braking distance on the basis of a type of the reference vehicle.

10. The vehicle control system according to claim 1, wherein the determiner derives a braking distance predicted to be run by the reference vehicle until a speed of the reference vehicle decelerating in accordance with braking becomes the same degree of a speed of the subject vehicle on the basis of a relative speed between the subject vehicle and the reference vehicle and adds a margin based on a time acquired by dividing a distance from a position of the reference vehicle to a position of the subject vehicle at a time point at which the lane change control is performed by the running controller by a speed of the reference vehicle at the time point to the derived braking distance and determines that the degree of braking is equal to or higher than the threshold in a case in which a sum of the braking distance and the margin is equal to or higher than a relative distance between the subject vehicle and the reference vehicle.

11. The vehicle control system according to claim 1, wherein the determiner changes the threshold in accordance with a necessity for lane change.

12. The vehicle control system according to claim 1, wherein the determiner repeats determination of whether the degree of braking is equal to or higher than the threshold using a newly recognized vehicle as the reference vehicle every time a new vehicle is recognized in the lane that is a destination of the lane change by the recognizer before the lane change is completed.

13. A vehicle control method using an in-vehicle computer, the vehicle control method comprising:
recognizing one or more other vehicles present in the vicinity of a subject vehicle;
performing lane change control of performing lane change of the subject vehicle by controlling at least steering of the subject vehicle;
determining whether or not a degree of braking predicted to be generated in a reference vehicle due to the lane change of the subject vehicle is equal to or higher than a threshold on the basis of a relative relationship between the reference vehicle present in a lane that is a destination of the lane change among the recognized one or more other vehicles and the subject vehicle in a case in which the lane change control is performed;
deriving a braking distance predicted to be run by the reference vehicle until a speed of the reference vehicle decelerating in accordance with braking becomes the same degree of a speed of the subject vehicle on the basis of a relative speed between the subject vehicle and the reference vehicle;

comparing the derived braking distance with a relative distance between the subject vehicle and the reference vehicle and determines that the degree of braking is equal to higher than the threshold in a case in which the braking distance is equal to or longer than the relative distance;

stopping the lane change control in a case in which it is determined that the degree of braking is equal to or higher than the threshold;

making the braking distance larger as a necessity for lane change of the subject vehicle is higher;

making the braking distance smaller as the necessity for lane change of the subject vehicle is lower; and a first lane change is higher necessity than a second lane change, the first lane change being a lane change associated with a branch or merge according to a predetermined destination, the second lane change being a lane change associated with overtaking another vehicle in front of the subject vehicle.

14. A computer-readable non-transitory storage medium storing a vehicle control program causing an in-vehicle computer to execute:

recognizing one or more other vehicles present in the vicinity of a subject vehicle;

performing lane change control of performing lane change of the subject vehicle by controlling at least steering of the subject vehicle;

determining whether or not a degree of braking predicted to be generated in a reference vehicle due to the lane change of the subject vehicle is equal to or higher than a threshold on the basis of a relative relationship between the reference vehicle present in a lane that is a destination of the lane change among the recognized one or more other vehicles and the subject vehicle in a case in which the lane change control is performed;

deriving a braking distance predicted to be run by the reference vehicle until a speed of the reference vehicle decelerating in accordance with braking becomes the same degree of a speed of the subject vehicle on the basis of a relative speed between the subject vehicle and the reference vehicle;

comparing the derived braking distance with a relative distance between the subject vehicle and the reference vehicle and determines that the degree of braking is equal to higher than the threshold in a case in which the braking distance is equal to or longer than the relative distance;

stopping the lane change control in a case in which it is determined that the degree of braking is equal to or higher than the threshold;

making the braking distance larger as a necessity for lane change of the subject vehicle is higher;

making the braking distance smaller as the necessity for lane change of the subject vehicle is lower; and a first lane change is higher necessity than a second lane change, the first lane change being a lane change associated with a branch or merge according to a predetermined destination, the second lane change being a lane change associated with overtaking another vehicle in front of the subject vehicle.

* * * * *